United States Patent

Strader

[11] 3,855,721
[45] Dec. 24, 1974

[54] FISHING LURE
[76] Inventor: James W. Strader, P.O. Box 4029, Tallahassee, Fla. 32303
[22] Filed: Aug. 17, 1972
[21] Appl. No.: 281,301

[52] U.S. Cl. .............................................. 43/42.32
[51] Int. Cl. ............................................ A01k 85/00
[58] Field of Search ........................ 43/42.32, 42.33

[56] References Cited
UNITED STATES PATENTS

| | | | |
|---|---|---|---|
| 1,736,403 | 11/1929 | Heddon | 43/42.32 X |
| 2,188,753 | 1/1940 | Jennings | 43/42.32 |
| 2,754,612 | 7/1956 | Means | 43/42.32 X |
| 2,799,963 | 7/1957 | Noer | 43/42.32 X |
| 2,957,265 | 10/1960 | Hunt | 43/42.32 X |
| 3,392,474 | 7/1968 | De Weese | 43/42.32 X |
| 3,533,183 | 10/1970 | Treaster | 43/42.32 X |

*Primary Examiner*—Robert Peshock
*Assistant Examiner*—Daniel J. Leach

[57] ABSTRACT

An artificial fishing lure for attracting fish in which the exterior portion or body of the lure has a randomly arranged, swirl reflective pattern of different electromagnetic frequencies such that a first portion of the surface reflects a first frequency and the remaining portion reflects a different electromagnetic frequency of energy. The reflectivity pattern on the outer surface is achieved by the arrangement of surface materials that absorb and reflect various frequencies of electromagnetic energy.

3 Claims, 3 Drawing Figures

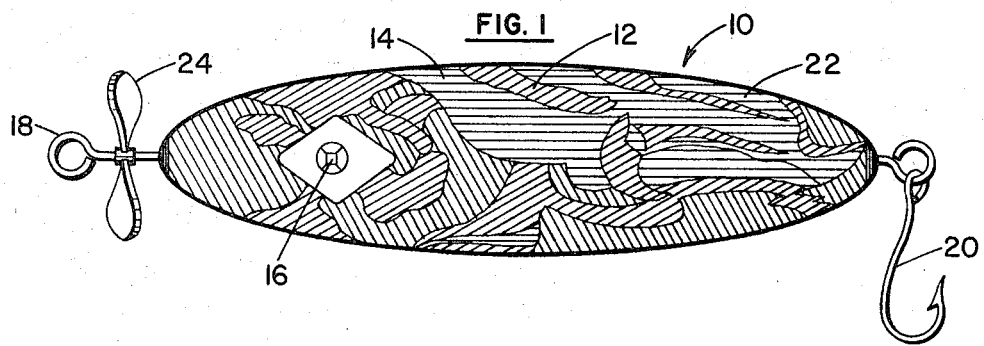
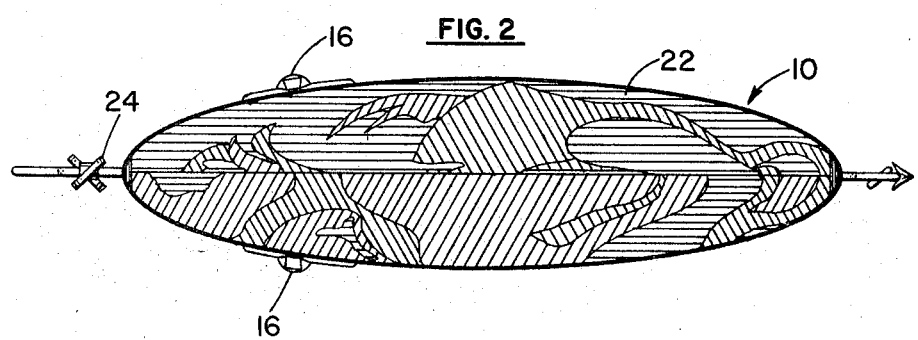
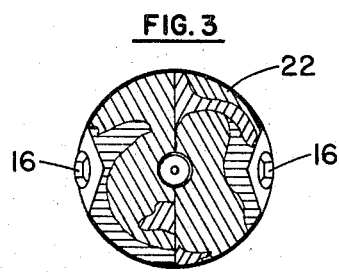

FISHING LURE

BACKGROUND OF THE INVENTION

This invention relates generally to an improved fishing lure or artificial tackle used to catch fish and includes a body portion having hooks attached thereto. In the past the attractiveness of the lure has been enhanced by spinners and highly shiny or metallic spinning devices attached adjacent to the lure. However, applicant has discovered that several kinds of fish are attracted to an artificial lure if the reflective pattern of electromagnetic energy eminating from the body portion of the lure is arranged in a particular pattern in accordance with particular electromagnetic frequencies. This combination of the fishing lure body and the reflective surfaces of the lure body provide an improved apparatus for the catching of fish.

Applicant provides an improved fishing lure or artificial tackle having particular electromagnetic energy reflective characteristics that provide for the attraction of nearby fish of various types.

BRIEF DESCRIPTION OF THE INVENTION

A fishing lure is provided having a body portion, hooking means attached to said body portion, and a plurality of surface portions, each of said portions providing a reflective characteristic electromagnetic frequency, said portions arranged adjacent each other about the body in a random swirl fashion or manner. The swirl areas are accomplished by reflecting different frequencies in the visible spectrum by providing materials whose atomic structures absorb particular frequencies of electromagnetic energy while reradiating out other particular frequencies of electromagnetic energy and there placed in a random matter in a swirl or twirling fashion about the body of the fishing lure. A particular different frequency may be achieved by the use of particular paints or colored plastics that are heated and blended together in a swirl matter to produce the desired frequency spectrum. The particular selective frequencies may be a function of the particular kind of fish that one is attempting to catch or the particular water coloration that the lure is to be used in.

It is an object of this invention to provide an improved artificial fishing lure.

It is another object of this invention to provide artificial fishing lure that has increased sensitivity in attracting fish.

And yet another object of this invention provides a fishing lure that reflects a particular electromagnetic energy pattern into the eye of a fish which causes the fish to be attracted to the lure.

In accordance with these and other objects which will be apparent hereinafter, the instant invention will now be described with particular reference to the accompanying drawing.

BRIEF DESCRIPTION OF THE DRAWING

FIG. 1 is a perspective side view of a fishing lure showing a randomly disposed swirl pattern in combination with a spinner;

FIG. 2 is a perspective plan view of the fishing lure of FIG. 1; and

FIG. 3 is a perspective end view of the fishing lure of FIG. 1 as seen from the front with the line coupling eye and spinner omitted.

PREFERRED EMBODIMENT OF THE INVENTION

The drawing shows a fishing lure 10 in accordance with applicant's invention having a body portion 22 which may be of any solid material shaped in resemblance of a particular undersea creature or aerodynamically shaped for flowing smoothly through the water, the body having artificial fish eyes 16 in the forward portion of the body and a line coupling eye 18 at the front of the device. Hooks may be disposed about the body such as hook 20 coupled at the rear portion of the lure body 22. The surface area of the lure body 22 is composed of different portions of material of various reflectivities of electromagnetic frequencies such that areas 12 and 14 are arranged randomly about the body in a swirl or twirling fashion so that there is a broad variation circumferentially and longitudinally in the electromagnetic spectrum frequency energy that is reflected in a point to point radius around the body peripherally. As a fish swims through the water electromagnetic energy reaches his eye and it has been determined that in certain groups of fish this spectrum variation and frequency variation arranged in such a pattern in combination with the lure body attracts fish such that he will attempt to strike at it and become hooked. Spinning devices such as spinner 24 may be added for additional inducement for catching fish but they are not necessary. The swirl pattern may also be affected by providing areas of complete electromagnetic absorption such as black areas relative to another area of reflectivity such as those which would reflect green or green and yellow portions adjacent to black swirling portions. These have been found to be extremely effective in providing for the catching of fish. The pattern is placed on a purely random swirl spreading about the body of the fishing lure.

Although green, yellow, and black have been found to be most effective in a swirl spectrum, other electromagnetic frequencies may be utilized that would produce a similar effect on the eye of the fish in combination with the lure shape and body.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An artificial fishing lure for attracting fish comprising:

a body portion, hooking means attached to said body portion, said body portion having a first surface portion that reflects electromagnetic energy of a first frequency, said body portion having a second portion that reflects electromagnetic energy of a second different frequency, said first and said second body exterior portion randomly disposed adjacent each other about the outer surface of said body providing a plurality of randomly disposed swirl patterns relative to the longitudinal and to the peripheral axes of said plug.

2. A fishing lure as in claim 1, wherein:
said first frequency is green light energy and,
said second frequency is yellow light energy.
3. A fishing lure as in claim 2, including:
a third surface portion that absorbs electromagnetic energy providing no reflection, randomly disposed adjacent between said first and second portion to provide a swirl pattern having blacked out areas interspersed between said first and said second portions randomly.

* * * * *